UNITED STATES PATENT OFFICE.

HEMAN S. LUCAS, OF CHESTER, MASSACHUSETTS.

IMPROVEMENT IN PROCESSES FOR PREPARING PAINTS.

Specification forming part of Letters Patent No. 9,422, dated November 23, 1852.

*To all whom it may concern:*

Be it known that I, HEMAN S. LUCAS, of Chester, in the county of Hampden, State of Massachusetts, have invented certain new and useful Improvements in the Composition of and Process for the Production of Pigments or Paints; and I do hereby declare that the following is a full, clear, and exact description thereof.

I have discovered that natural rocks—such as serpentine, containing magnesia and oxide of iron united to hydrous silica or silicic acid, or constituted in part of hydrous silicates of magnesia and iron—may be partially decomposed by acids—as sulphuric or muriatic—so as to have the silica ready to combine with and give permanency and beauty to pigments formed on the undecomposed part of the rock remaining. This undecomposed part of the rock I call the "basis," as it has, when dried, the mechanical and chemical qualities which are desired in pigments, and serves to give "body" or opacity to precipitated colors.

The nature of my invention consists in treating natural rocks—such as serpentine and allied rocks containing magnesia and ferruginous silicates—with acid to form a basis for coloring agents to produce pigments or paints.

In preparing my basis from rocks of the above-described character for the preparation of pigments I proceed by decomposing in part the hydrous natural compound in the rock after it has been finely powdered, and I use sulphuric or other cheap acid with water to dispossess the silica or silicic acid in the natural rock. To the resulting semi-fluid mass any previously-prepared color is to be added and well mixed. The whole mass must then be washed with water to remove salts, and dried, when a solid pigment or paint is obtained.

The method of preparation which I adopt and prefer is as follows: Taking the average of the magnesian rocks or serpentines—such as those of Chester, Massachusetts—I find it to contain about twelve per cent. of oxide of iron and twenty per cent. of magnesia in union with about thirty-five per cent. of hydrous silica or silicic acid. I add the fine powder of this rock to a mixture of twenty-five pounds of oil of vitriol and twenty-five pounds of water until about one hundred pounds have been used. This mixture is mixed uniformly and ten pounds of prussiate of potash, dissolved in forty pounds of hot water, are then added and carefully mixed with the semi-fluid mass. After the whole has become cold I add water sufficient to dissolve all the salts present, and when these have been removed I wash, drain, and dry the pulpy mass. In this way, by varying the proportions or nature of the coloring material added to the basis, I prepare and fix by chemical combination different colors and shades upon my basis. The first or strong waters washed from the prepared basis contain salts of magnesia and potash, and may be concentrated by heat, so as to afford salts by crystallization.

The essential part of my invention and discovery is the preparation and use of a basis for preparing colors, this basis being derived from rocks of the magnesian class—such as serpentine and the like—by partial decomposition, in which acids unite to magnesia and oxide of iron. This basis resulting from the process above described is a new combination of the earthy and hydrous silicates such as have never before been used for a like purpose, possessing a spongy-formed structure, together with opacity and body in a remarkable degree. It has the mechanical characteristics of a pigment similar to those possessed by carbonate of lead. The basis so prepared is capable of forming with the oil a varnish of a most enduring character, while the natural silicates afforded by the rock before it has been decomposed do not permit any combination with the oil, and when dried after mixture do not produce adhesive paints, the valuable properties of the mineral combinations in the prepared basis being purely the result of chemical changes.

What I claim as my invention, and desire to secure by Letters Patent, is—

The process of treating magnesian minerals—such as serpentine, silicates of magnesia and iron, and similar rocks—by mineral acids to prepare from the sedimentary or insoluble or undecomposed portions of such rocks a mineral product, which I call a "basis," to be used in the preparation of pigments, substantially as set forth in the specification.

HEMAN S. LUCAS.

Witnesses:
CANSTEN BROWN,
WILLIAM MACLEOD.